United States Patent [19]

Arai

[11] Patent Number: 5,280,599
[45] Date of Patent: Jan. 18, 1994

[54] COMPUTER SYSTEM WITH MEMORY EXPANSION FUNCTION AND EXPANSION MEMORY SETTING METHOD

[75] Inventor: Makoto Arai, Fussa, Japan

[73] Assignee: Kabushiki Kaisha Toshiba, Kawasaki, Japan

[21] Appl. No.: 49,663

[22] Filed: Apr. 21, 1993

Related U.S. Application Data

[63] Continuation of Ser. No. 462,546, Jan. 9, 1990, abandoned.

[30] Foreign Application Priority Data

Jan. 9, 1989 [JP] Japan ........................... 1-2450

[51] Int. Cl.$^5$ ............... G06F 12/00; G06F 13/00; G06F 12/16
[52] U.S. Cl. ................ 395/425; 364/DIG. 1; 364/245; 364/245.4
[58] Field of Search ............... 364/200MS, 900MS, 245, 245.4; 395/400, 425

[56] References Cited

U.S. PATENT DOCUMENTS

| | | | |
|---|---|---|---|
| 4,307,448 | 12/1981 | Sattler | 395/400 |
| 4,500,962 | 2/1985 | Lemaire et al. | 395/425 |
| 4,571,676 | 2/1986 | Mantellina et al. | 395/425 |
| 4,926,322 | 5/1990 | Stimac et al. | 395/500 |
| 4,943,910 | 7/1991 | Nakamura | 395/425 |
| 4,984,149 | 1/1991 | Iwashita et al. | 395/425 |
| 5,042,003 | 8/1991 | Belt et al. | 395/425 |

Primary Examiner—Alyssa H. Bowler
Assistant Examiner—Frank J. Asta
Attorney, Agent, or Firm—Oblon, Spivak, McClelland, Maier & Neustadt

[57] ABSTRACT

An expansion memory is used in a configuration of a first, second or third expansion memory. The first expansion memory is an expanded memory according to the EMS (Expanded Memory Specification) system which is accessed by a CPU through a window. The second memory (extended memory) is allocated within a memory address space so that it is accessed directly by the CPU. The third expansion memory is a combination of the first and second expansion memories. An operator specifies the capacities of the first and second expansion memories from a keyboard. The CPU determines from the entered capacity of the expansion memory that the extension memory is to be arranged in one of the first to third configurations and with what capacity so as to output control information to an expansion memory arrangement setting device. The expansion memory arrangement setting device responds to the control information to arrange the expansion memory in the specified configuration and capacity.

10 Claims, 8 Drawing Sheets

SETTING OF EXPANSION MEMORY
FIRST EXPANDED MEMORY = 1 MB
SECOND EXTENDED MEMORY = 1 MB

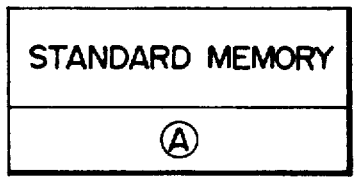
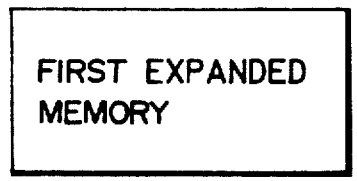
F I G. 6A  FIRST EXPANDED MEMORY ARRANGEMENT
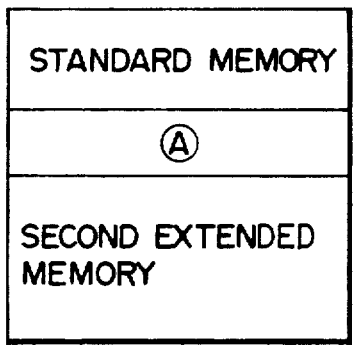
F I G. 6B  SECOND EXTENDED MEMORY ARRANGEMENT
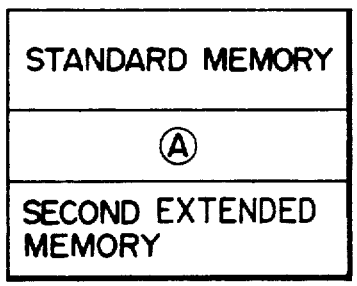
F I G. 6C  THIRD COMBINATION MEMORY ARRANGEMENT

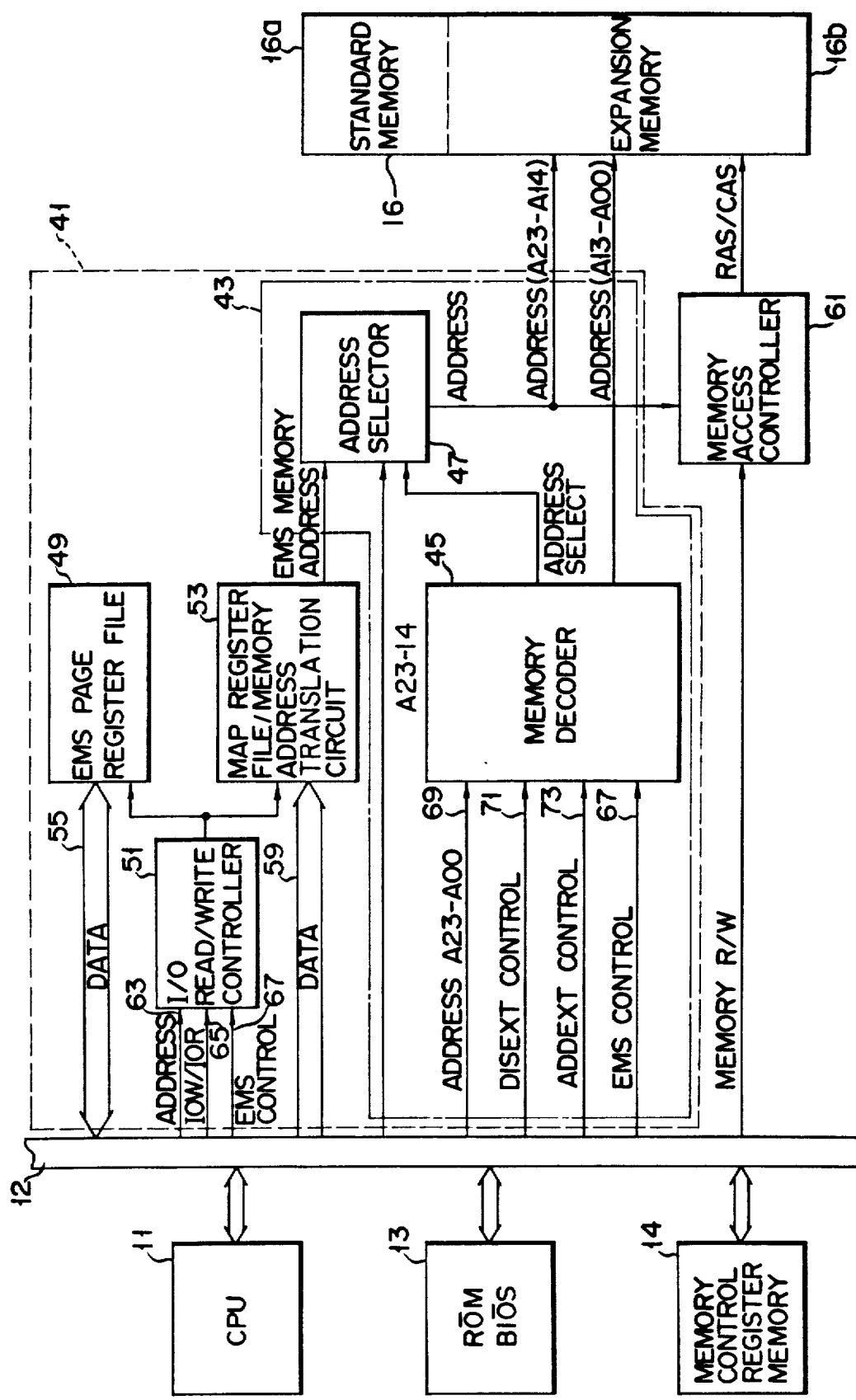
F I G. 7

|  | EMS | DISEXT | ADDEXT |
|---|---|---|---|
| FIRST EXPANDED MEMORY ARRANGEMENT | 1 | 1 | 0 |
| SECOND EXTENDED MEMORY ARRANGEMENT | 0 | 0 | 1 |
| THIRD COMBINATION MEMORY ARRANGEMENT | 1 | 0 | 0 |

F I G. 8

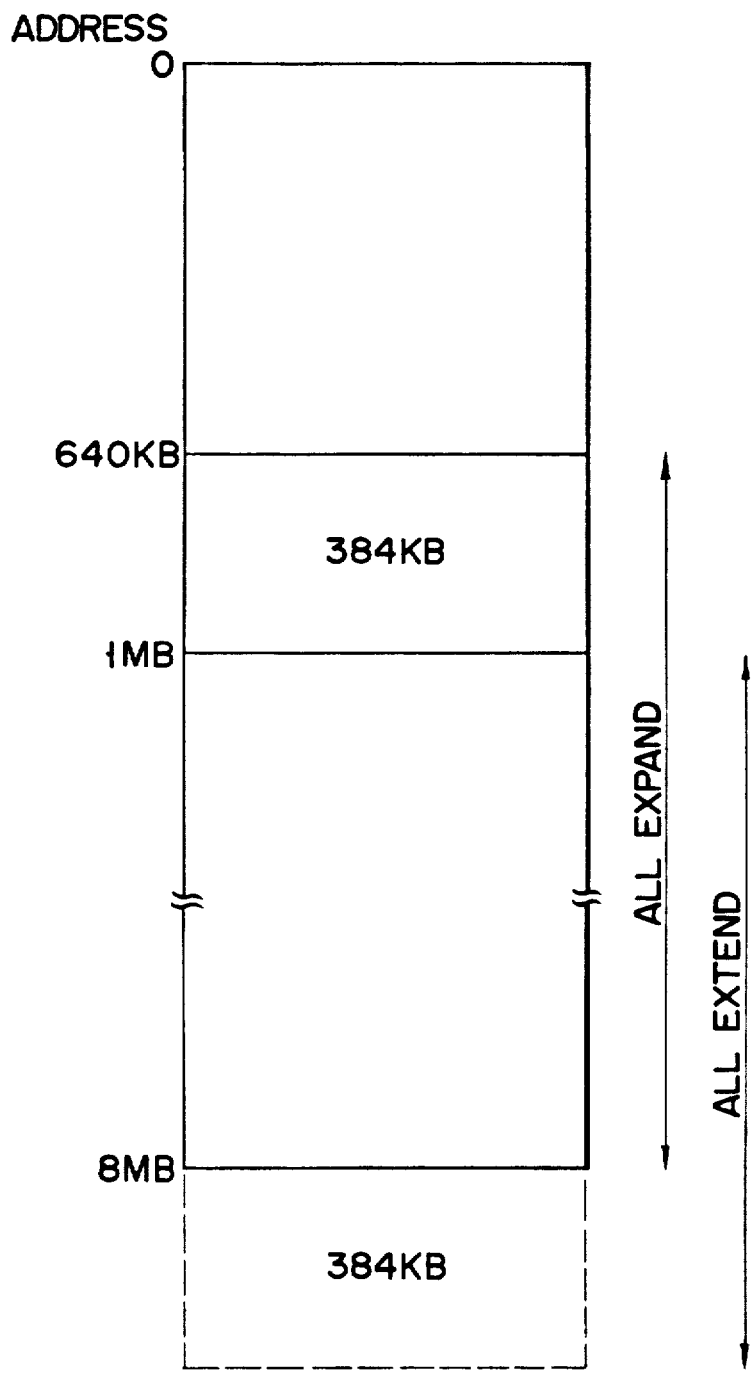
F I G. 9

COMPUTER SYSTEM WITH MEMORY EXPANSION FUNCTION AND EXPANSION MEMORY SETTING METHOD

This application is a continuation of application Ser. No. 07/462,546, filed on Jan. 9, 1990, now abandoned.

BACKGROUND OF THE INVENTION

1. Field of the Invention

The present invention relates to a computer system provided with a memory expansion function and, more particularly, to a computer system suitable for an expansion memory to be used in various expanded and extended memory configurations.

2. Description of the Related Art

In recent years, personal computers have an increasing tendency to increase their memory capacity and various types of memory expansion systems have been used. As expanded and extended memory systems, the following three systems have been in practical use.

The first memory expanded system is called EMS (Expanded Memory Specification) system. The system uses part of a memory address space as a window and accesses an expanded memory through the window. The system was developed jointly by three companies of Lotus, Intel and Microsoft and thus also called LIM-/EMS. Memory cards (boards) that meet the specifications of the LIM/EMS system are commercially available by Intel and other companies.

The EMS system includes hardware having a paging function and software for controlling it. The software is called EMM (Expanded Memory Manager) and is a resident driver program which can be installed by users.

An example of conventional memory maps using the EMS system is illustrated in FIG. 1. A part of a standard memory that the CPU can access directly is used as the EMS window, which is referred to as a physical page. The size of the physical page is 16 kbytes and there are four contiguous physical pages. The 64-kbyte area is referred to as a page frame. The expanded memory is accessed in units of 16 kbytes by each physical page and each unit of 16 kbytes of the expanded memory is referred to as a logical page. The CPU can access a maximum of 512 pages through the page frame.

The expanded memory is divided into units of sets for being controlled. One expanded memory system consists of a maximum of four sets each of which is formed of four classes Each of sets has a page control register. The switching between a physical page and a logical page is carried out by writing the page number of a logical page into the page control register in each of the classes assigned to an I/O port address.

In this case, a memory address space of one megabyte (MB) or more is accessed through the window (page frame). In other words, in practice CPU can access a memory address space of one megabyte or more by accessing the window. Hereinafter, the expanded memory of the EMS system is referred to as a first expanded memory, and a configuration in which all of expanded memories are formed of first expanded memories is referred to as a first expanded memory configuration.

With the second system, a standard memory and an extended memory are allocated within an address space so that they are directly accessed by CPU. Hereinafter, the extended memory according to this second system is referred to as the second extended memory, and a configuration in which all of extended memories are formed of second extended memories is referred to as a second extended memory configuration. In the following description, the first and second systems described above may also be referred to as the expand system and the extend system.

The third system is configured such that part of expanded memory is made up of the first expanded memory and the remaining part thereof is made up of the second extended memory.

Thus, to construct computer systems so that they can execute application programs prepared to accommodate various different types of expanded and extended memories is important for succession to software assets.

However, there would be the possibility of occurrence of malfunctions if the above three types of expanded and extended memories were made available using the same hardware arrangement. For example, MSDOS supports 640 Kbytes, but is made up to access an expanded memory exceeding one megabyte, for example, through a window as shown in FIG. 2. Depending on machines, however, CPU could directly access a memory address space of one megabyte or more. The direct access by CPU might destroy the contents of a data area allocated in the memory exceeding one megabyte through EMM. More specifically, in the prior art, the memory configuration data of the expanded memory and the extended memory is not given to a memory system. This permits the expanded memory to be accessed by both CPU direct access and access through the window. Therefore, the expanded memory cannot automatically be protected from being accessed by CPU direct access, and also the extended memory cannot automatically be protected from being accessed by access through the window.

Furthermore, the prior system cannot detect the boundary between the expanded memory and the extended memory to thereby automatically control access of both the expanded memory and the extended memory.

SUMMARY OF THE INVENTION

It is an object of the present invention to provide a computer system which permits desired expanded and extended memory configurations to be set easily without the occurrence of malfunctions.

According to an aspect of the present invention there is provided a computer system provided with a standard memory and an expanded and extended memory which can be used in a plurality of configurations comprising: specifying means for specifying a configuration of use and capacity of the memory; expanded and extended memory arrangement setting means for allowing said expanded and extended memory to be used in one of the configurations or a combination thereof; and setting control means for controlling the expanded and extended memory arrangement setting means according to the configuration of use and the memory capacity specified by the specifying means to allow access to the expanded and extended memory having the specified configuration of use and memory capacity.

According to a second aspect of the present invention there is provided an extension memory setting method for use in a computer system including a standard memory, memory which can be used in a plurality of configurations of use and an expanded and extended memory, arrangement setting device which allows the expanded and extended memory to be used in one of the configurations of use or a combination thereof, the method comprising the steps of: specifying the capacity of the expanded and extended memories used in the configurations of use; determining the configuration of use and the capacity of the expanded and extended memories on the basis of the specified capacity; controlling the memory arrangement setting device on the basis of the configuration of use and the capacity of the expanded and extended memory obtained by the determining step to access the expanded and extended memory.

According to the present, invention, a desired expanded or extended memory arrangement can easily be set by only specifying the memory capacity without the need of conventional setting operations and whereby no malfunction will occur.

BRIEF DESCRIPTION OF THE DRAWINGS

FIGS. 6A through 6C illustrate memory maps of a first expansion memory (expanded memory) arrangement, a second expansion memory (extended memory) arrangement and a third combination memory (expanded memory and extended memory) arrangement which is a combination of the first expanded memory and second extended memory arrangements;

FIG. 7 is a detailed block diagram of an expansion memory setting circuit;

FIG. 8 shows a table of correspondence of logical values of control signals of EMS, DISEXT and ADDEXT with the first, second and third expansion memory arrangements, and FIG. 9 is a conceptional diagram for explaining "all expand" and "all extend" systems.

DETAILED DESCRIPTION OF THE PREFERRED EMBODIMENTS

Figure 1:
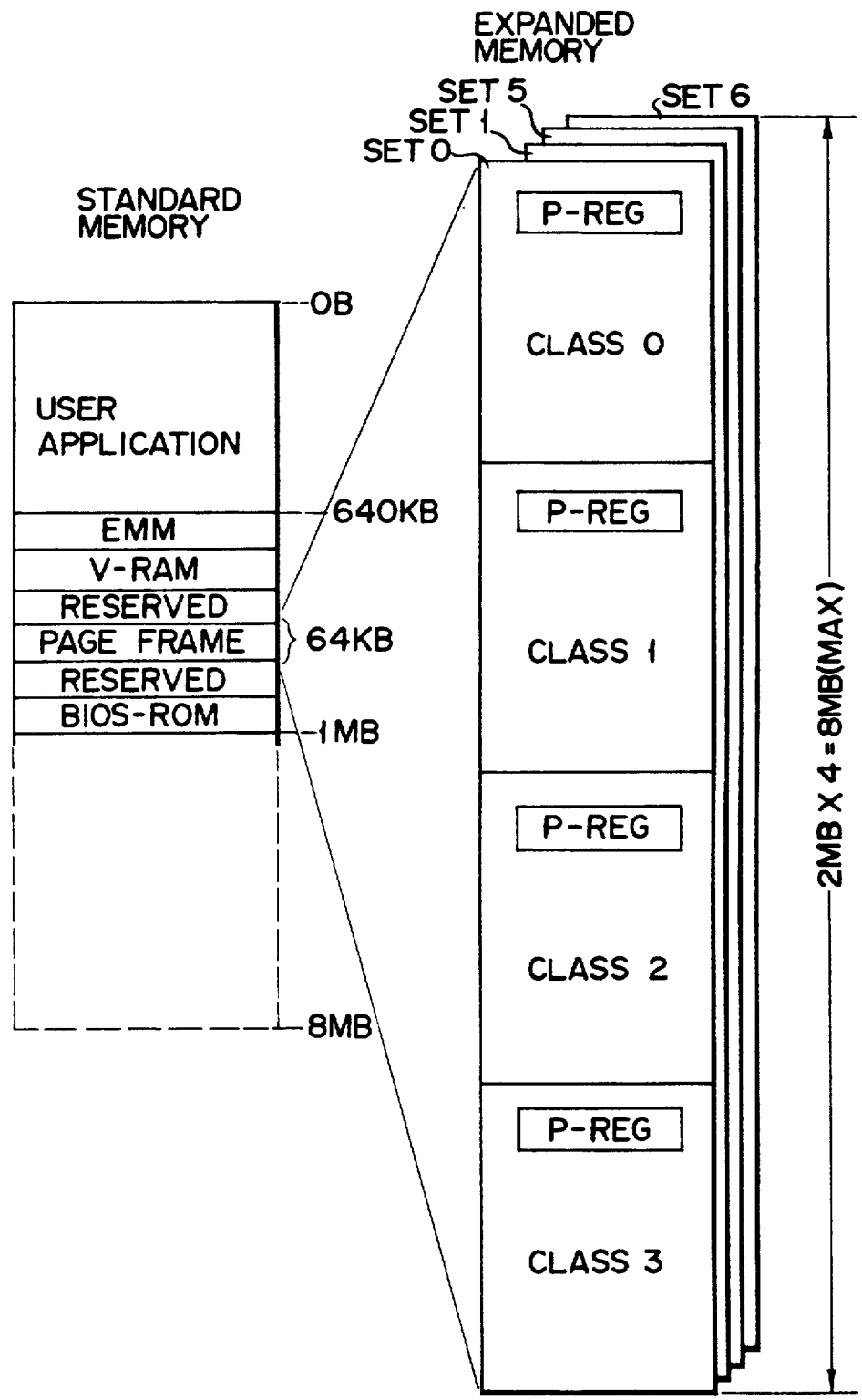
FIG. 1 is a conceptional diagram of an expanded memory according to the EMS system.
Figure 2:
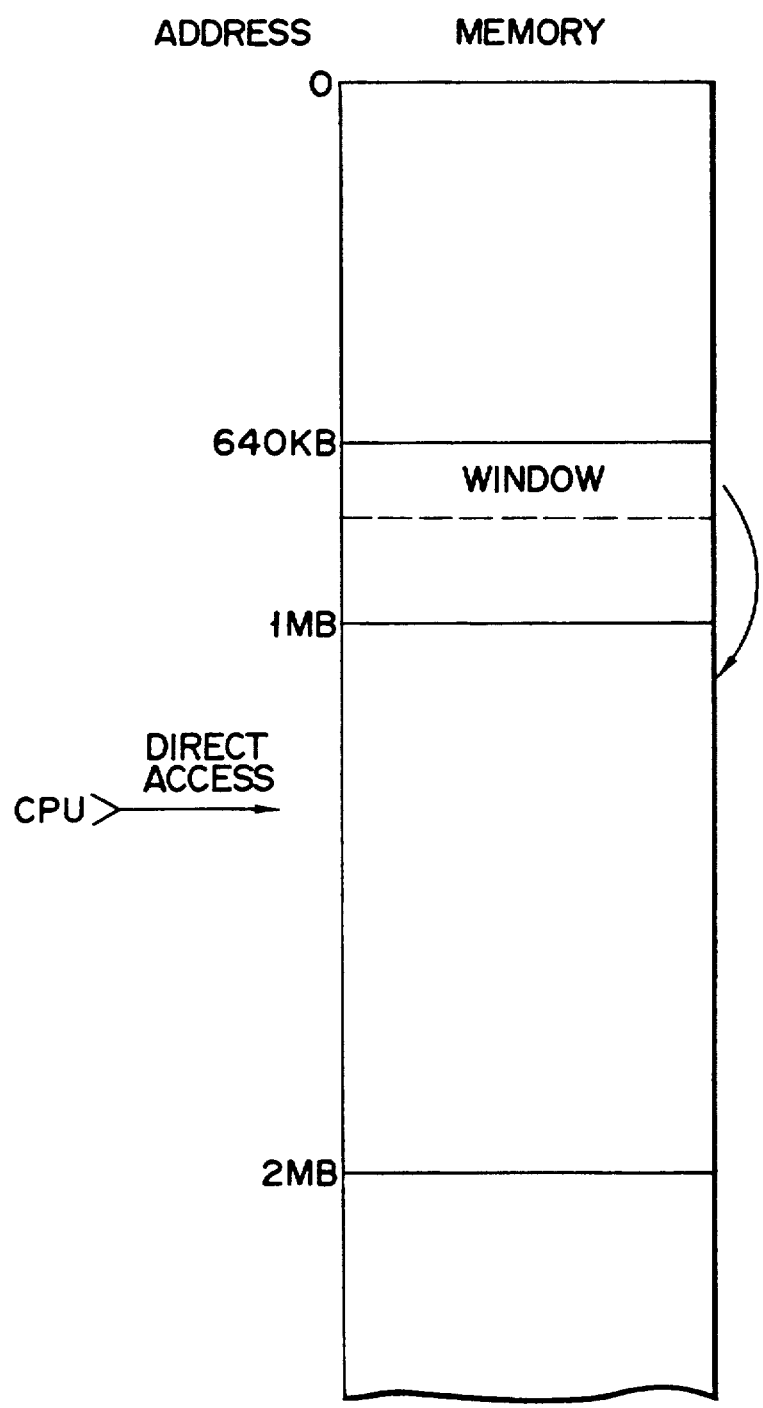
FIG. 2 is a conceptional diagram for explaining drawbacks of the prior art.
Figures 3, 4:
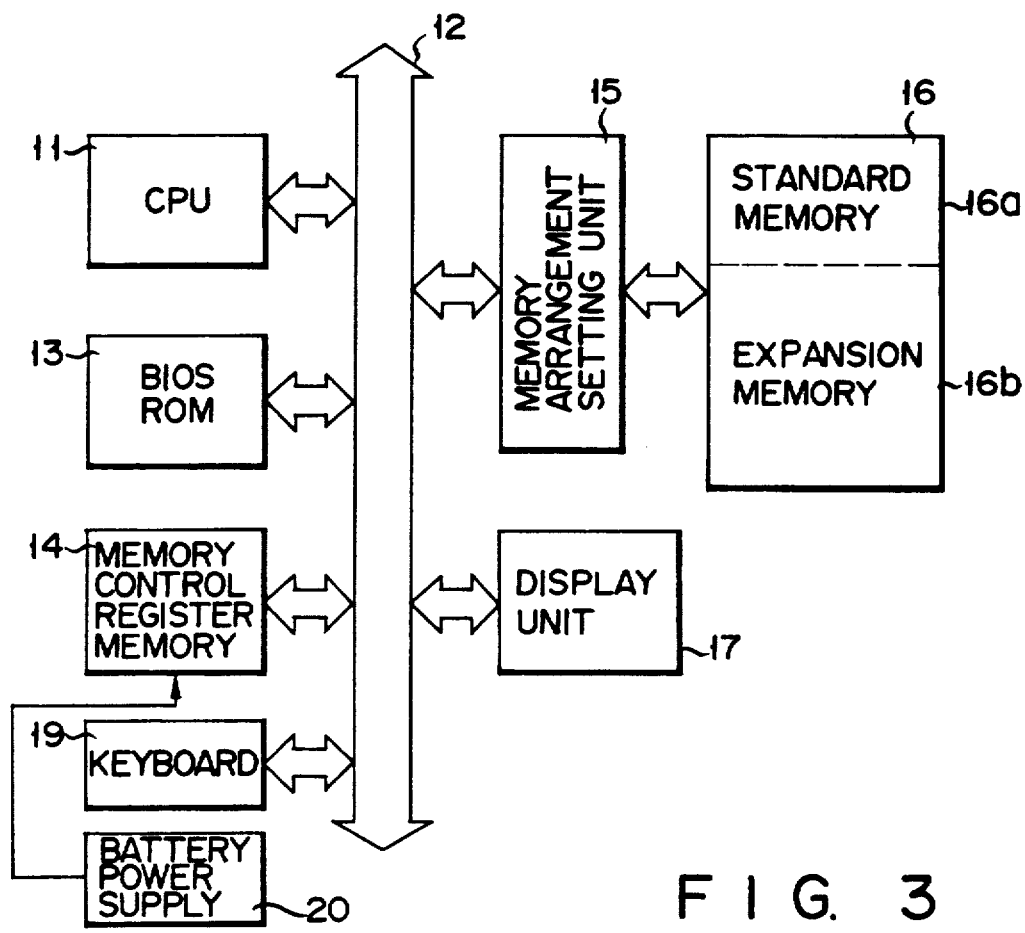
FIG. 3 is a block diagram of a computer system embodying the present invention.
FIG. 4 illustrates an example of a display screen used in setting of expansion memory in the embodiment of the present invention.

Referring now to FIG. 3, to a CPU (Central Processing Unit) 11 adapted to control the overall system are connected a BIOS ROM (basic input and output system program read only memory) 13, a memory control register memory 14, a memory arrangement setting unit 15, a standard and expansion memory 16, a display 17 and a keyboard 19 via a system bus 12.

Figure 5:
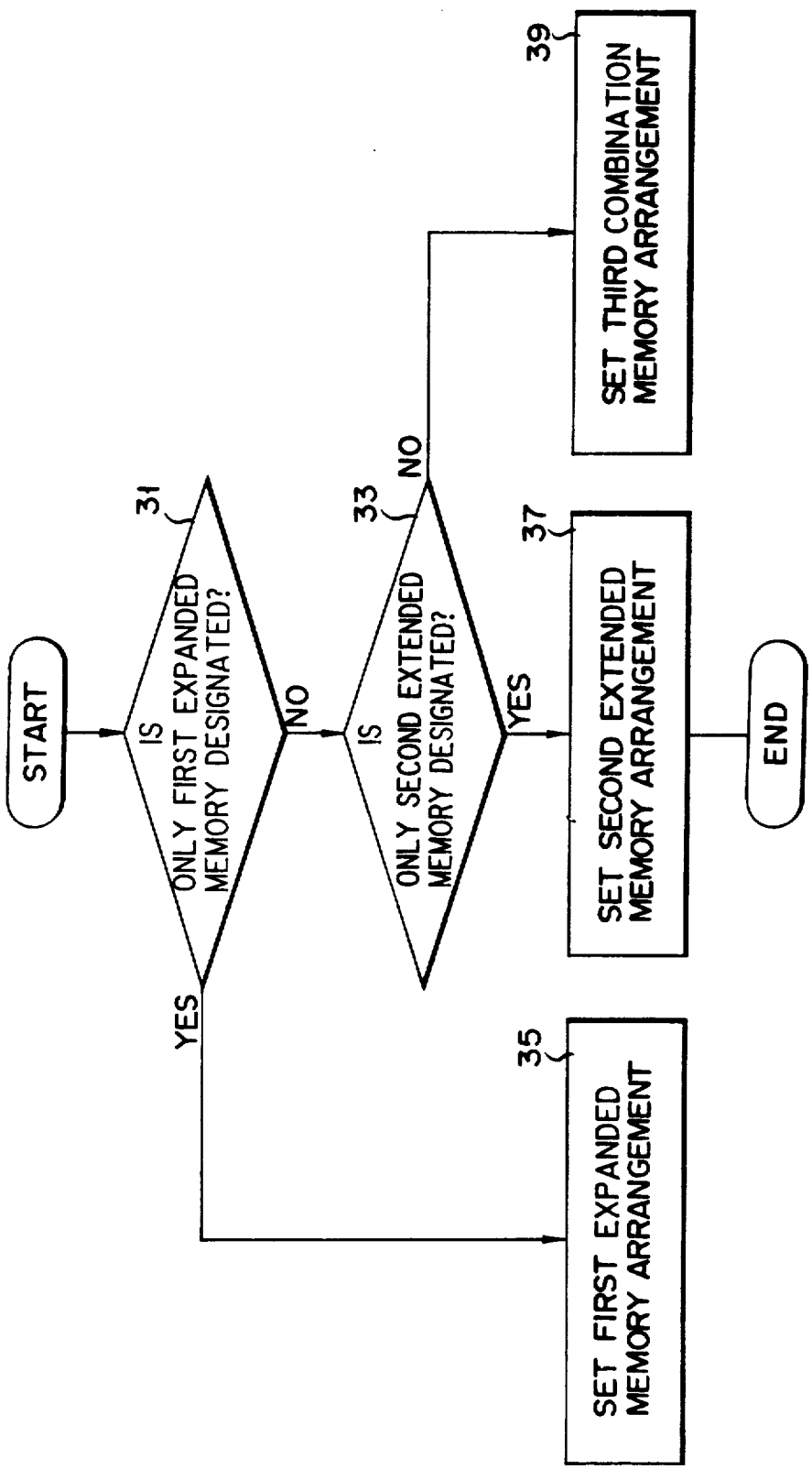
FIG. 5 is a flowchart for automatically setting the extended memory.

BIOS ROM 13 is a nonvolatile memory which stores control programs for performing controls such as initialization and setting of hardware at a time of turning ON the system power supply and a program for performing an operation represented by a flowchart shown in FIG. 5. Memory control register memory 14 is adapted to store information required to set each piece of hardware (the configuration and capacity of expanded and extended memories, EMS control signal, DISEXT control signal and ADDEXT signal which are to be described later). Being supplied with a supply voltage from a battery power supply 20, memory control register memory 14 holds status information even when the system power supply is cut off.

Memory arrangement setting unit 15 is a hardware device which enables various types of expanded and extended memory arrangements (first, second and third combination memory arrangements) to be realized under the control of BIOS ROM 13. Expansion memory 16b is a memory which is used in each of the memory arrangements separately from standard memory 16a under the control of memory arrangement setting unit 15. In standard memory 16a, which is not controlled by memory arrangement setting unit 15, is stored a hardware arrangement setting program for storing memory arrangement status in memory control register memory 14.

The operation of the embodiment of the present invention will be described with reference to FIGS. 3, 4 and 5.

The hardware arrangement setting program stored in standard memory 16 a is started with the result that such contents as shown in FIG. 4 are displayed on the display screen of display 17. Operator specifies a desired one of the first, second and third memory arrangements and its memory capacity (the memory capacity of each of the first and second expanded and extended memories) from keyboard 19. In the example of FIG. 4, one megabyte (MB) is specified for each of the first and second expanded and extended memories. In this embodiment, both of the first and second expanded and extended memories are specified. To use the first expanded memory only, it is only required that the capacity of the second extended memory be set to 0 megabyte (MB). Likewise, to use the second extended memory only, the capacity of the first expanded memory has only to be set to 0 megabyte.

Data on the capacities of the specified first and second expanded and extended memories are stored in memory control register memory 14. Information (the capacities of the first and second expanded and extended memories in this embodiment) stored in memory control register memory 14 continues to be held even when the system power supply is turned OFF because memory 14 is supplied with supply voltage from battery 20.

After the capacities of the first and second expanded and extended memories have been specified, BIOS ROM 13 is started to execute initialization and setting of hardware. At this time, the setting of the expanded and extended memory arrangements is also carried out.

The operation of setting the expanded and extended memory arrangements will be described below with reference to the flowchart shown in FIG. 5.

In step 31, CPU, 11 reads the capacities of the first and second expanded and extended memories from memory control register memory 14 so as to check whether or not only the first expanded memory is to be used. For example, a determination is made as to whether the second extended memory capacity is specified as "0" or not as in the case of first expanded memory=2 MB and second extended memory=0 MB. As a result of this determination, where only the first expanded memory is used, CPU 11 controls memory arrangement setting unit 15 so that expansion memory 16b may have the first expanded memory arrangement, in step 35.

Where only the first expanded memory is not used, on the other hand, CPU 11 determines, in step 33, whether only the second extended memory is used or not. For example, a determination is made as to whether the capacity of the first expanded memory is specified as "0" or not as in the case of first expanded memory=0 MB and second extended memory=2 MB. As a result of this determination, where only the second extended memory is used, CPU 11 controls, in step 37, memory arrangement setting unit 15 so that expansion memory 16b may have the extended memory arrangement.

When the first and second extended memories are both used, CPU 11 controls memory arrangement setting unit 15 so that expansion memory 16b may have the third memory arrangement, in step 39.

As described above, the capacities of the first and second extended memories have only to be specified to control memory arrangement setting unit 15 so that expansion memory 16b may have one of the first, second and third combination memory arrangements. Therefore, a desired extension memory arrangement can easily be set without need for troublesome operations as in the prior art. Also, there is no misuse of expansion memory 16b.

In FIGS. 6A through 6C there are shown expansion memory address locations in the first, second and third combination memory arrangements. In FIGS. 6A through 6C, areas denoted by A are used for a separate purpose.

FIG. 6A shows the first memory arrangement (the expanded memory according to the EMS system). Since the first expanded memory is accessed through a window between 640 kbytes and one megabyte as described above, it may be located anywhere within the memory address space behind the extended memory. FIG. 6B shows the second extended memory arrangement in which the extended memory is allocated to part of the memory address space. In this case, the CPU can directly access the extended memory. Moreover, FIG. 6C shows the third combination memory arrangement in which the first and second expanded and extended memories are both used for expansion memory 16b.

FIG. 7 is a detailed block diagram of memory arrangement setting unit 15. In FIG. 7 like reference numerals are used to designate corresponding parts to those in FIG. 3 and descriptions thereof are omitted. In FIG. 7, a portion surrounded with broken lines designates first expanded memory arrangement setting circuit 41 and a portion surrounded with dashed and dotted lines designates second extended memory arrangement setting circuit 43. Expanded and extended memory arrangement setting circuit 15 is composed of first memory arrangement setting circuit 41 and second extended memory arrangement setting circuit 43. Second extended memory arrangement setting circuit 43 comprises a memory decoder 45 and an address selector 47. First expanded memory arrangement setting circuit 41 includes an EMS page register file 49, an I/O read/write control circuit 51 and a map register file/memory address translation circuit 53 in addition to memory decoder 45 and address selector 47. EMS page register 49 is connected to system bus 12 via data bus 55. A page number to be accessed is entered into EMS page register file 49. In the present embodiment, as described above, there are four sets of 0, 1, 5 and 6 and each set comprises 128 pages. Thus, any one of page numbers of up to 512 pages is set in EMS page register file 49.

I/O read/write control circuit 51 is connected to system bus 12 to receive within-page address information (ADDRESS) 63, control information (IOW/IOR) 65 representing a read or write operation and EMS control information 67 representing whether the expansion memory of the EMS system is to be enabled or to be disabled. As a result, I/O read/write control circuit 51 supplies various control signals to EMS page register file 49 and map register file/memory address translation circuit 53. For example, if EMS control signal 67 represents enabling of the expansion memory, then control circuit 53 produces a LOAD signal to load page number data on data bus 55 into EMS page register file 49, a LOAD signal to load the high-order addresses (top addresses of sets 0, 1, 5, 6) on data bus 59 into map register file 53 and an ENABLE signal for memory address translation circuit 53.

When EMS control signal 67 represents DISABLE, page number data on data bus 55 is prohibited from being set in EMS page register file 49, the high-order address on data bus 59 is prohibited from being set in the map register file and moreover the memory address translation circuit is disabled. Memory address translation circuit 53 adds the page register number set in EMS page register file 49, within-page address and (the base address,(i.e., the start addresses of sets 0, 1, 5, 6) stored in map register file to create a EMS address which is in turn supplied to address selector 47. Address selector 47 further receives an address (A23-A14) (this address is supplied from the CPU in "all extend" system shown in FIG. 9) from CPU 11 via system bus 12 and responds to an address select signal from memory decoder 45 described later to select either the EMS memory address or the address (A23-A14) from CPU 11 for transmission to memory access controller 61 and memory 16. Memory access controller 61 outputs a RAS (row address strobe) signal and a CAS (column address strobe) signal to memory 16 for access thereto.

Memory decoder 45 of the second extended memory setting circuit 43 receives address information (A23-A00) 69, DISEXT control signal 71, ADDEXT control signal 73, and EMS control signal 67. When DISEXT signal 71 is in the ENABLE state, memory addresses exceeding one megabyte are made invalid. When ADDEXT control signal 73 is in the ENABLE state, 384 Kbytes from 640 Kbytes to 1 Mbyte are assigned to the last of the extended memory. That is, as shown in FIG. 9, 0 to 640 KB is an address space supported by the MSDOS. The address space of 384 Kbytes from 640 KB to 1 MB are not usually assigned to the main memory but assigned to a ROM or an external card ROM. Since the extended memory is accessed through a window in the case of the Expand system, the CPU can access an address space from 640 KB to 8 MB by address translation. In the Extend system, however, even if the CPU directly accesses the address space of 384 Kbytes from 640 KB to 1 MB, the ROM will be accessed as described above. Thus, the expanded memory of 384 KB cannot be accessed. For this reason, the all extend system is arranged such that the 384 KB address space is set after the extended memory (after 8 MB in the present embodiment), and in practice the CPU accesses the memory contents in the address space from 640 KB to 1 MB even if it, accesses the 384-KB address space after the extended memory of 8 MB. When the EMS control signal is in the ENABLE state, CPU 11 is allowed to access the expanded memory through the window. In this state, access to the address space of 384 Kbytes from 640 Kbytes to 1 Mbyte by CPU 11 is made invalid.

Logical values of EMS control signal 67, DISEXT control signal 71 and ADDEXT control signal 73 when each of the first expanded memory arrangement, the second extended memory arrangement and the third combination memory arrangement is set are represented in FIG. 8. By setting the logical values of such EMS, DISEXT and ADDEXT control signals according to the first to third combination memory arrangements, an address select signal is output from memory decoder 45 to control address selector 47. More specifically, when EMS, DISEXT and ADDEXT are "1", "1"and "0", respectively, address selector 47 outputs an EMS memory address to expanded memory 16b. When EMS, DISEXT and ADDEXT are "0", "0" and "1", respectively, address selector 47 outputs an address (A23-A14) supplied from CPU 11 to extended memory 16b. When EMS, DISEXT and ADDEXT are "1", "0" and "0", respectively, address, selector 47 outputs an EMS memory address to combination memory 16b, and memory decoder 45 outputs address information (A13-A00) to expanded memory 16b.

What is claimed is:

1. An expansion memory configuration setting method for use in a computer system including a standard memory, an expansion memory including an expanded memory and/or an extended memory, a memory arrangement setting device which allows said expansion memory to be configured by selecting how much of the expansion memory is to be used for each of the standard, extended and expanded memories after determining a capacity size of the expansion memory and memory control register means for storing data, said memory configuration setting method comprising the steps of:

specifying a capacity size of each of said extended and expanded memories;

storing memory configuration data in accordance with the specified capacity size of each of said extended and expanded memories, into the memory control register means;

executing initialization and setting of the computer system after said storing step;

outputting, in response to the executing step, control information in accordance with said memory configuration data stored in the memory control register means to said memory arrangement setting device; and arranging each of the extended and expanded memories in response to said output control information and controlling the memory arrangement setting device to access each of the extended memory and expanded memory.

2. The method according to claim 1, wherein the capacity size specifying step includes the step of specifying the expansion memory as all expanded memory.

3. The method according to claim 1, wherein the capacity size specifying step includes the step of specifying the expansion memory as all extended memory.

4. The method according to claim 1, wherein the capacity size specifying step includes the step of specifying the expansion memory as a combination of the expanded memory and the extended memory.

5. The method according to claim 1, wherein the outputting step includes the steps of producing at least one of a first control signal representing whether or not the expansion memory is to be enabled for the expanded memory, a second control signal representing whether or not the memory is to be enabled for the extended memory and a third control signal, representing whether or not a part of the standard memory is to be assigned to an end portion of the extended memory.

6. The method according to claim 5, wherein the arranging and controlling step includes the step of producing an address selecting signal to access the arranged expanded memory or arranged extended memory in accordance with one of the first, second and third control signals.

7. An information processing apparatus defining a window in a portion of an address space of a CPU and accessing memory area, comprising:

a memory section including an expansion memory constituting at least one of an expanded memory which is accessed through the window, an extended memory which has an address space of 1 MB or more, and a combination of the expanded memory and the extended memory;

means for setting, as memory configuration data, the expansion memory as a) all expanded memory, b) all extended memory, or c) a combination of the expanded memory and the extended memory;

means for storing the memory configuration data;

means for executing initialization of the information processing apparatus after it has stored the memory configuration data; and memory control means, connected to the storing means and the CPU, for controlling memory access in accordance with the memory configuration data, such that when the all expanded memory configuration is set, memory access is performed through the window and when the all extended memory configuration is set, memory access is directly performed by the CPU, and the access to an address space from 640 KB to 1 MB is made by accessing a memory space having boundary addresses beyond an upper boundary of the extended memory address space.

8. The apparatus according to claim 7, wherein the memory configuration data includes a memory capacity size.

9. The apparatus according to claim 7, further comprising means, coupled to the memory control means, for outputting one of a first control signal representing whether or not the expansion memory is to be enabled for the expanded memory, a second control signal representing whether or not the memory is to be enabled for the extended memory and a third control signal, representing whether or not a part of the standard memory is to be assigned to an end portion of the extended memory.

10. The apparatus according to claim 9, further comprising means for producing an address selecting signal for accessing the expanded memory or extended memory in accordance with one of the first, second and third control signals.

* * * * *